(12) United States Patent
Fink et al.

(10) Patent No.: US 7,341,419 B1
(45) Date of Patent: Mar. 11, 2008

(54) MECHANISM FOR SECURING A TILT FRAME OF A HOOK LIFT HOIST TO A TRUCK FRAME

(75) Inventors: Jerome T. Fink, Hutchinson, KS (US); Gary L. Fleming, Springdale, AR (US)

(73) Assignee: Krause Corporation, Hutchinson, KS (US)

( * ) Notice: Subject to any disclaimer, the term of this patent is extended or adjusted under 35 U.S.C. 154(b) by 278 days.

(21) Appl. No.: 10/974,068

(22) Filed: Oct. 27, 2004

(51) Int. Cl.
*B60P 1/04* (2006.01)
(52) U.S. Cl. ............... 414/491; 414/448; 414/546
(58) Field of Classification Search ........ 414/475–478, 414/403, 467, 498, 491, 500
See application file for complete search history.

(56) References Cited

U.S. PATENT DOCUMENTS

| | | | |
|---|---|---|---|
| 3,892,323 A * | 7/1975 | Corompt | 414/491 |
| 4,132,325 A * | 1/1979 | Corompt | 414/498 |
| 4,290,726 A * | 9/1981 | Sutela et al. | 414/421 |
| 4,848,619 A * | 7/1989 | Corompt | 220/1.5 |
| 5,108,247 A | 4/1992 | Vlaanderen et al. | |
| 5,163,800 A | 11/1992 | Raisio | |
| 5,213,466 A | 5/1993 | Bubik | |
| 5,290,138 A | 3/1994 | Smart et al. | |
| 5,395,201 A * | 3/1995 | Yamashita et al. | 414/467 |
| 5,531,559 A * | 7/1996 | Kruzick | 414/498 |
| 5,542,807 A | 8/1996 | Kruzick | |
| 5,967,735 A | 10/1999 | Smart et al. | |
| 6,558,104 B1 | 5/2003 | Vlaanderen et al. | |
| 6,710,589 B2 * | 3/2004 | Tuan et al. | 324/158.1 |
| 7,112,030 B2 * | 9/2006 | Renziehausen | 414/500 |
| 2006/0263184 A1 * | 11/2006 | Simpson et al. | 414/476 |
| 2007/0098533 A1 * | 5/2007 | Curtis et al. | 414/477 |
| 2007/0154295 A1 * | 7/2007 | Kuriakose | 414/546 |

OTHER PUBLICATIONS

Safety Latch Installation Instructions published at least as early as Jan. 2003.
Sales brochure for KP625/630 Hooklift by American Hook Lift by K-PAC, exact publication date unknown but at least more than 1 year prior to filing date of present application.
Exhibit 1, photograph of latch mechanism on sale at least one year prior to filing date of present application- see attached addendum for description of latch mechanism.

* cited by examiner

*Primary Examiner*—Saul Rodriguez
*Assistant Examiner*—Gina M. Lupino
(74) *Attorney, Agent, or Firm*—Erickson & Kleypas, L.L.C.

(57) ABSTRACT

A locking mechanism for locking a tilt frame of a hoist to a vehicle frame comprises a semi-annular ring connected in axial alignment to the hub of a hoist lift arm. The ring is adapted to receive a pin connected to the vehicle frame. An opening is formed in the ring and is sized to permit the pin to pass therethrough. When the lift arm is advanced to a retracted position relative to the vehicle frame the opening is positioned below the pin, such that the tilt frame may be pivoted relative to the base frame. When the lift arm is pivoted out of the retracted position to load and unload a container, the ring extends in overlapping position below the pin to prevent the tilt frame from pivoting relative to the base frame.

25 Claims, 12 Drawing Sheets

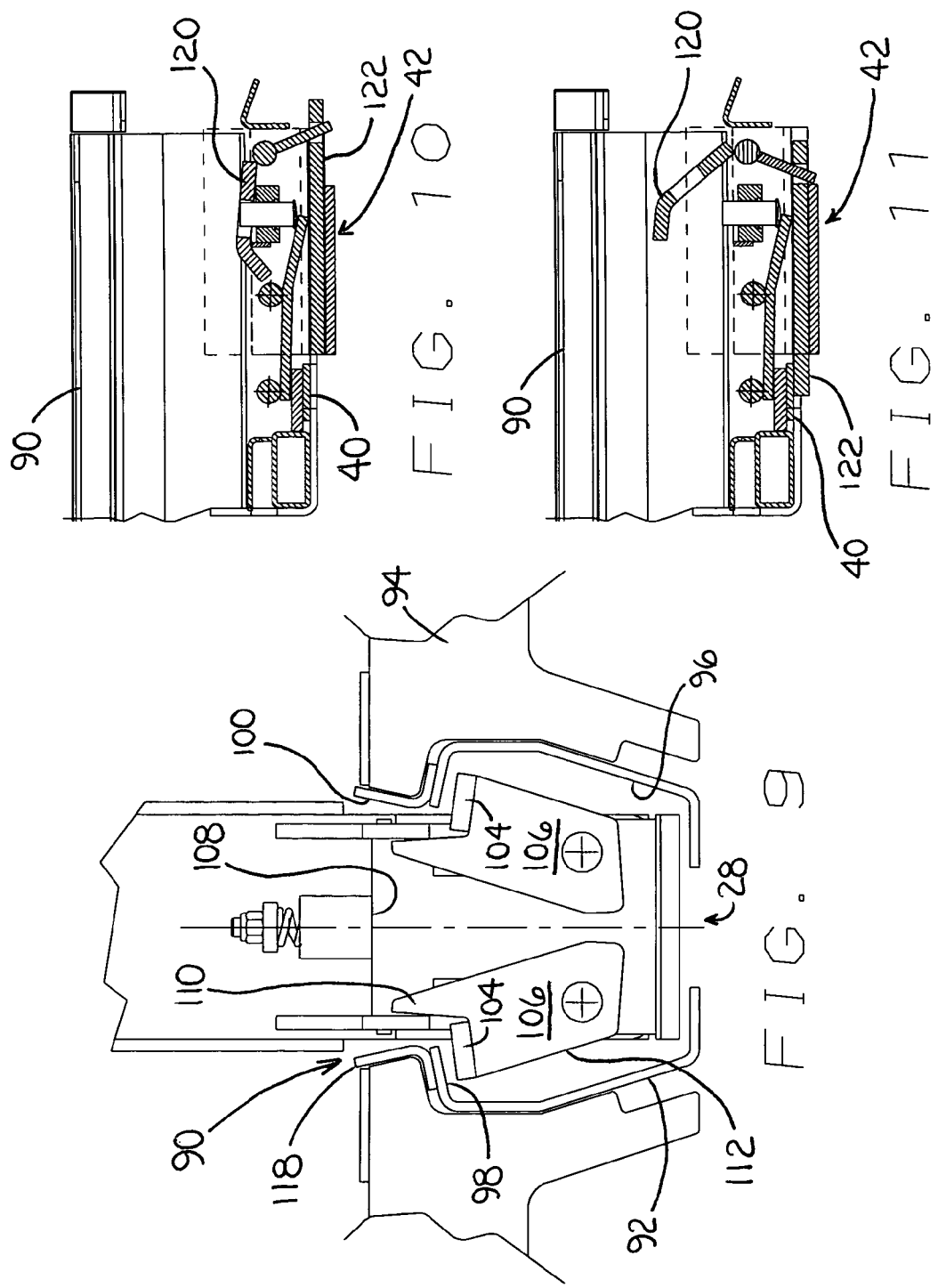

MECHANISM FOR SECURING A TILT FRAME OF A HOOK LIFT HOIST TO A TRUCK FRAME

BACKGROUND OF THE INVENTION

This invention relates to vehicle mounted hook lift hoists and in particular to mechanisms for operatively coupling a tilt frame of the hoist to the frame of the truck.

Hook lift hoists are used to load and unload relatively large containers, bins, pallets, flat racks and the like onto a truck. The hoist generally includes an L-shaped boom or lift arm pivotally connected relative to the truck frame at a rear end of a first leg of the boom and a hook formed on the distal end of the second leg of the boom. Hydraulic actuators are used to pivot the L-shaped boom to position the hooked end behind the truck and to engage a container or the like. The hydraulic actuators are then retracted to pivot the hooked end of the boom toward the front of the truck pulling the container onto the truck bed. The process is reversed to unload the container from the truck. Rollers mounted on at least the rear of the truck facilitate loading and unloading the container therefrom. The first leg of the boom may be formed from telescoping members to permit the second leg to be extended away from the rear of the truck to facilitate lifting and pulling containers onto the truck frame.

As shown in U.S. Pat. No. 5,290,138, it is also known to pivotally mount the L-shaped boom or lift arm on a tilt frame that is in turn pivotally connected to the truck frame to permit the contents of a container to be dumped while supported on the tilt frame. In FIG. 4D of U.S. Pat. No. 5,290,138, the tilt frame is shown pivoted relative to the truck frame to assist in lowering the hook to a relatively low position. It is also known to latch the tilt frame to the truck frame near the front of the tilt frame when the L-arm is in its retracted position and used to load and unload a container to prevent the tilt frame from unintentionally raising when loading and unloading a container.

If the operator of the hook lift hoist, in attempting to lift a container off of the ground, inadvertently extends instead of retracts the hydraulic actuators controlling movement of the lift arm, a significant upward force can be exerted on the tilt frame where it is connected to the lift arm. The upward forces exerted on the tilt frame due to such an error can bend or otherwise damage the tilt frame members. To avoid such bending or damage, it is known to increase the strength of the tilt frame by forming it out of larger, thicker or heavier material or beams. However, doing so adds to the cost and the weight of the vehicle mounted hook lift hoist and therefore is an undesirable solution.

SUMMARY OF THE INVENTION

The present invention comprises a tilt frame coupling mechanism for a vehicle mounted hoist. The tilt frame is pivotally mounted to the base frame of the vehicle and pivotal between a retracted position and an extended position. A lift arm, for loading and unloading containers onto the vehicle, has a pivot end pivotally connected to the tilt frame about a pivot axis and a free end having a hook formed thereon. The hook is adapted to releasably couple with a pin, bar or rod secured to a container.

The tilt frame coupling mechanism comprises a pin or stud connected to and projecting outward from the base frame of the vehicle and a discontinuous arcuate coupling member connected to the pivot end of the lift arm in axial alignment with the pivot axis of the lift arm. The arcuate coupling member is positioned relative to the lift arm so as not to extend beneath the stud when the lift arm is in the retracted position and to advance beneath the stud when the lift arm is pivoted out of the retracted position through its remaining range of motion.

When the lift arm is pivoted out of the retracted position, the stud extends in closely spaced relation above the arcuate coupling member as it rotates about the pivot axis with the lift arm. To the extent the load on the lift arm causes the tilt frame to try to flex upward, the arcuate coupling member on the tilt frame engages the stud on the vehicle base frame connecting or tying the tilt frame to the base frame and preventing further upward movement of the tilt frame relative to the base frame. Because the tilt frame is linked to the vehicle base frame when the lift arm is pivoted out of the retracted position, the size of the structure forming the tilt frame can be reduced, lessening its weight and thereby saving on material costs and energy costs in operating the vehicle. The decrease in frame weight may allow an increase in the weight of the payload that can be carried on the vehicle.

Other advantages of the invention will become apparent from the following ion taken in connection with the accompanying drawings, wherein is set forth by way ration and example, an embodiment of the present invention.

BRIEF DESCRIPTION OF THE DRAWINGS

FIG. 9 is an enlarged cross-sectional view taken along line 9-9 of FIG. 7 showing engagement of a lift arm latch with a lift arm latch receiver.

FIG. 10 is an enlarged and fragmentary cross-sectional view taken along line 10-10 of FIG. 7 and showing a tilt frame latch for releasably latching the tilt frame to a subframe connected to the vehicle frame.

FIG. 11 is a view similar to FIG. 10 showing the tilt frame latch released.

DETAILED DESCRIPTION

As required, a detailed embodiment of the present invention is disclosed herein; however, it is to be understood that the disclosed embodiment is merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 4:
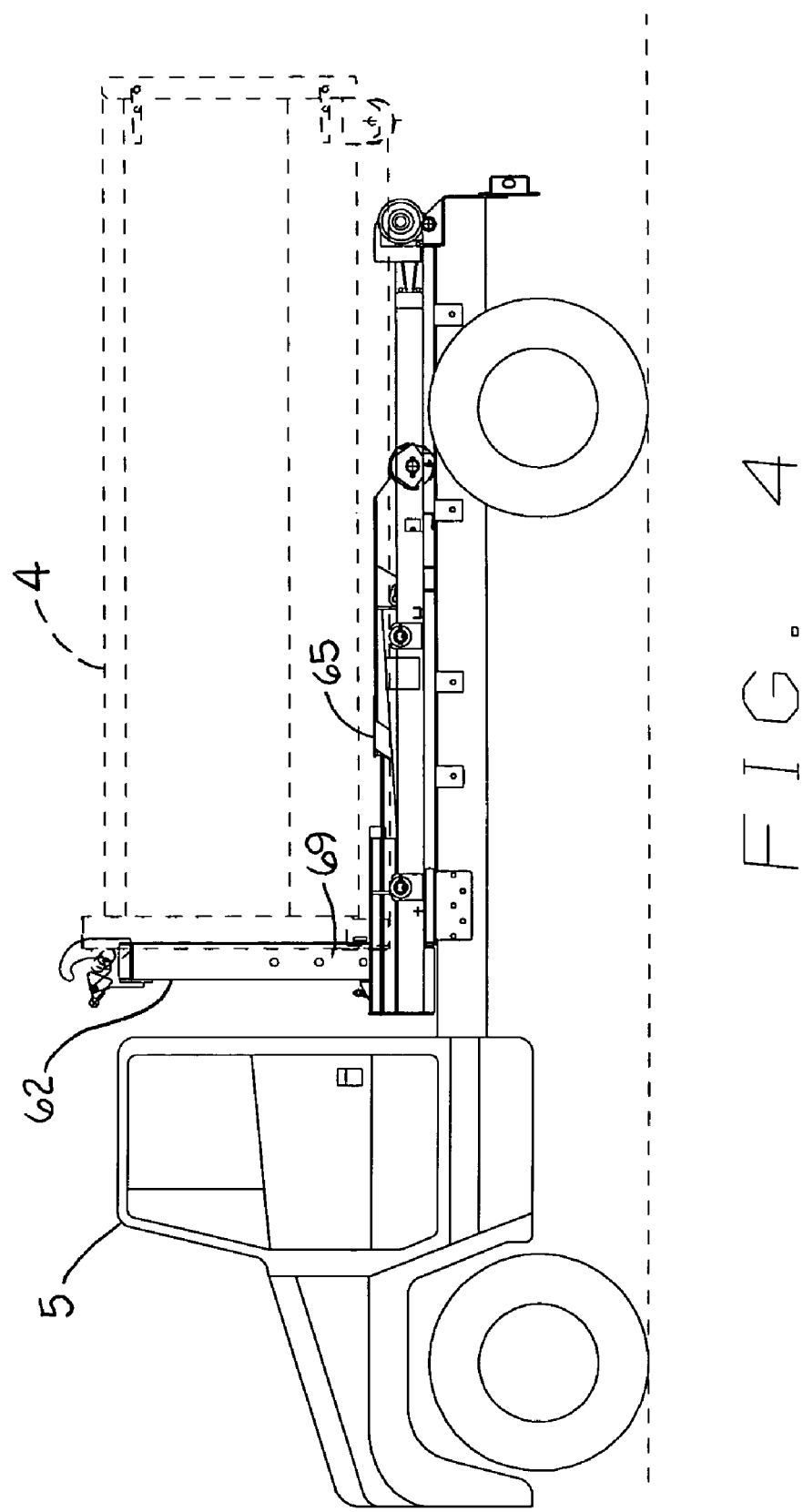
FIG. 4 is a view similar to FIG. 1 showing an inner boom of said lift arm extended relative to an outer boom with the lift arm in the retracted position and showing in phantom lines a container coupled to the lift arm.
Figure 5:
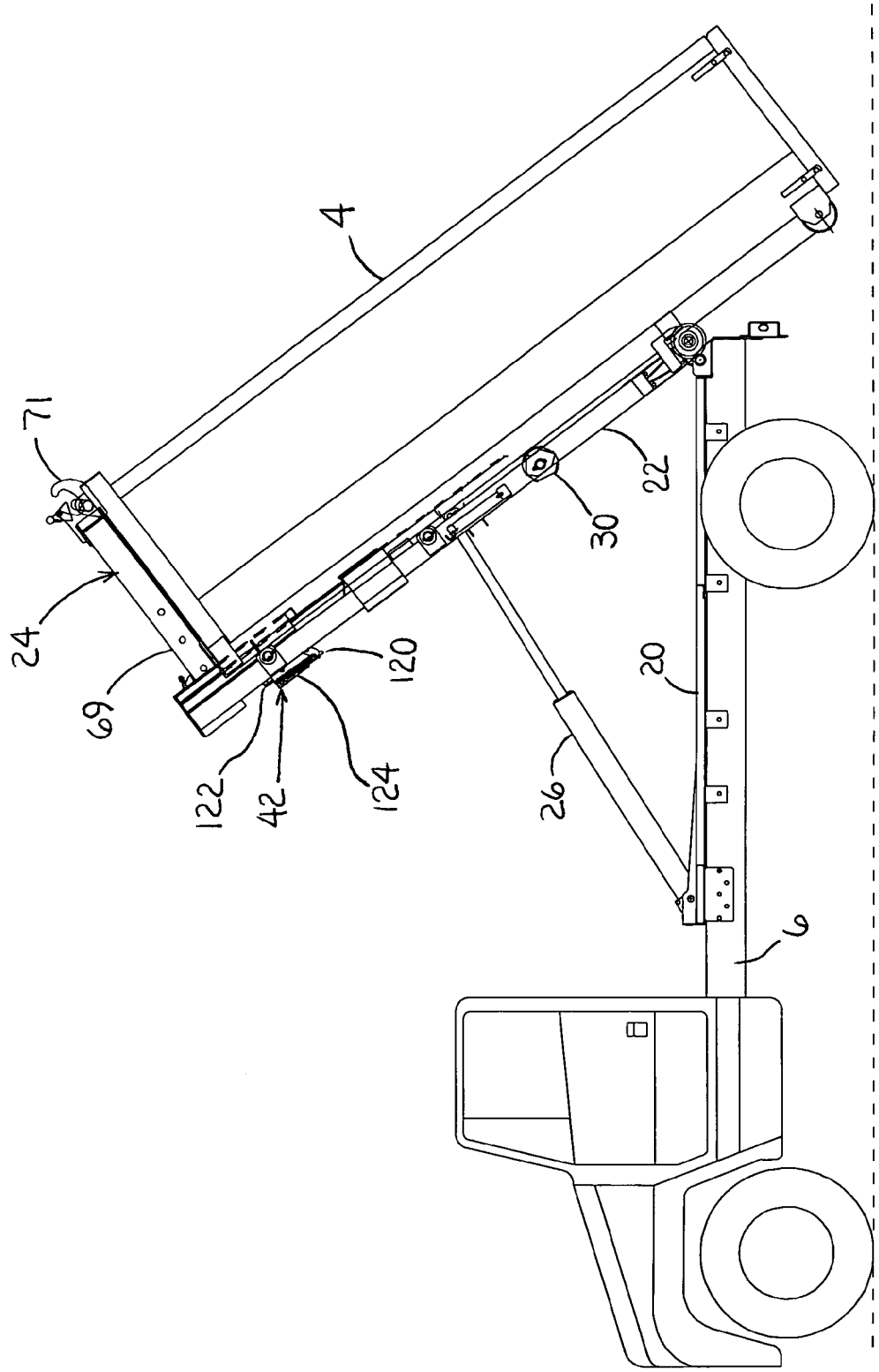
FIG. 5 is a view similar to FIG. 1 showing a tilt frame of the hook lift hoist pivoted upward relative to the vehicle frame with a container coupled to the lift arm.
Figure 6:
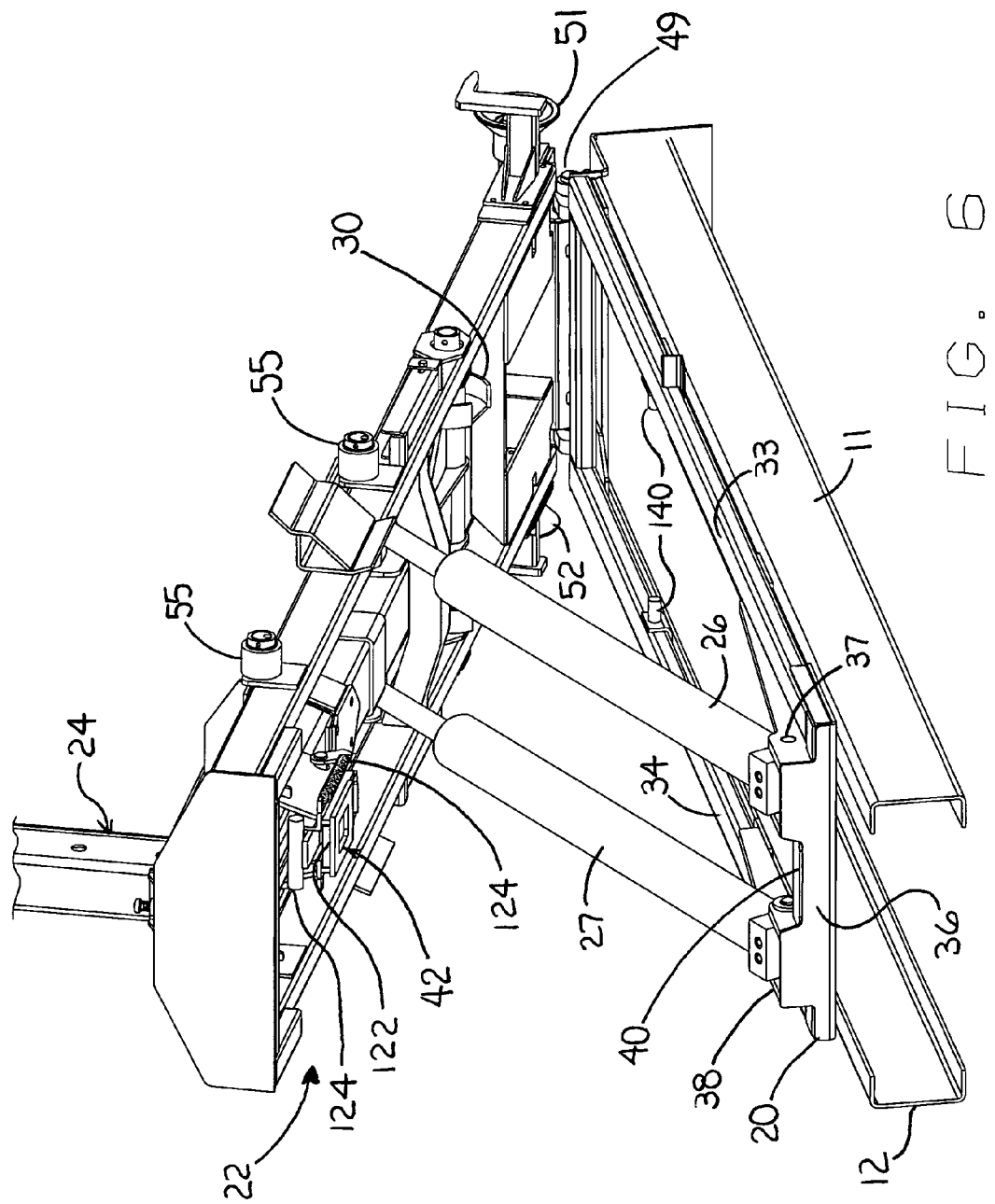
FIG. 6 is a fragmentary perspective view of the hook lift hoist attached to the vehicle frame and showing the tilt frame pivoted upward relative to the vehicle frame.

Referring to the drawings in more detail, FIGS. 1-5 show a hook lift hoist assembly 1 shown mounted to a vehicle 3, comprising a truck for use in lifting containers 4 and the like. FIGS. 1-5 show the hook lift hoist assembly 1 in various orientations utilized in loading and unloading a container 4 from the vehicle 3 and dumping the contents of the container 4. As used herein the term container 4 is intended to include containers, bins, pallets, flat tracks and other devices or structures for carrying or supporting loads which can be loaded onto a vehicle or trailer. The term vehicle is intended to be interpreted broad enough to cover trailers as well as trucks and the like. The vehicle 3 shown, includes a cab 5, frame or chassis 6, front wheels 7 and rear wheels 8. Referring to FIG. 6, which is a fragmentary, perspective view of the hook lift hoist assembly 1 secured to the vehicle frame 6, the frame 6 includes left and right main frame members or beams 11 and 12 as well as additional structural members interconnecting or attached to the beams 11 and 12.

Directional references will be made with reference to a driver sitting in the cab 5 of the vehicle 3, with the cab 5 located at or toward the front or forward end of the vehicle 3 and the rear wheels 8 located toward the rear or rearward end of the vehicle 3. The side of the vehicle 3 toward the driver's left is considered the left side and the side of the vehicle to the driver's right is considered the right side of the vehicle 3.

The hook lift hoist assembly 1, is typically assembled separate from the vehicle 3 and then mounted thereon. As seen in FIGS. 1-6, with particular reference to FIG. 6, the hook lift assembly 1 includes a sub-frame 20, a tilt frame 22, a lift arm 24, left and right hydraulic actuators 26 and 27, lift arm latch 28, and a pair of tilt frame coupling members or ring locks 30. As discussed in more detail below, sub-frame 20 is fixedly secured to the frame 6, the tilt frame 22 is pivotally connected to the sub-frame 20 at their respective rear ends, and the lift arm 24 is pivotally connected to the tilt frame 22. The lift arm latch 28 releasably connects the lift arm 24 to the tilt frame 22 to prevent the lift arm 24 from pivoting relative to the tilt frame 22 when the tilt frame 22 is pivoted relative to the main frame 6. The tilt frame ring locks 30 releasably connect or tie the tilt frame 22 to the main frame 6 to selectively prevent the tilt frame 22 from pivoting relative to the main frame 6 and to distribute the load exerted on the tilt frame 22 by the lift arm 24 to the main frame 6, when the lift arm 24 is used to lift a container 4.

The sub-frame 20 includes parallel extending left and right sub-frame members 33 and 34 which are fixedly connected to left and right main frame beams 10 and 11 respectively by bolting, clamping, welding or the like. The sub-frame members 33 and 34 are preferably sized approximately the same width as the main frame beams 10 and 11 and to extend from the rear end of the main frame beams 10 and 11 respectively toward the cab 5. An actuator mount 36 is connected to and extends between the left and right sub-frame members 33 and 34. The actuator mount 36 generally includes a pair of clevises, left and right devises 37 and 38, to which one end of the left and right hydraulic actuators 26 and 27 respectively may be pivotally connected. The actuator mount 36 further includes a latch plate 40 extending between the devises 37 and 38. The latch plate 40 is selectively engaged by a tilt frame latch 42 on the tilt frame 22 to latch the front end of the tilt frame 22 to the sub-frame, and therefore the vehicle frame 6 as described in more detail hereinafter.

Figure 7:
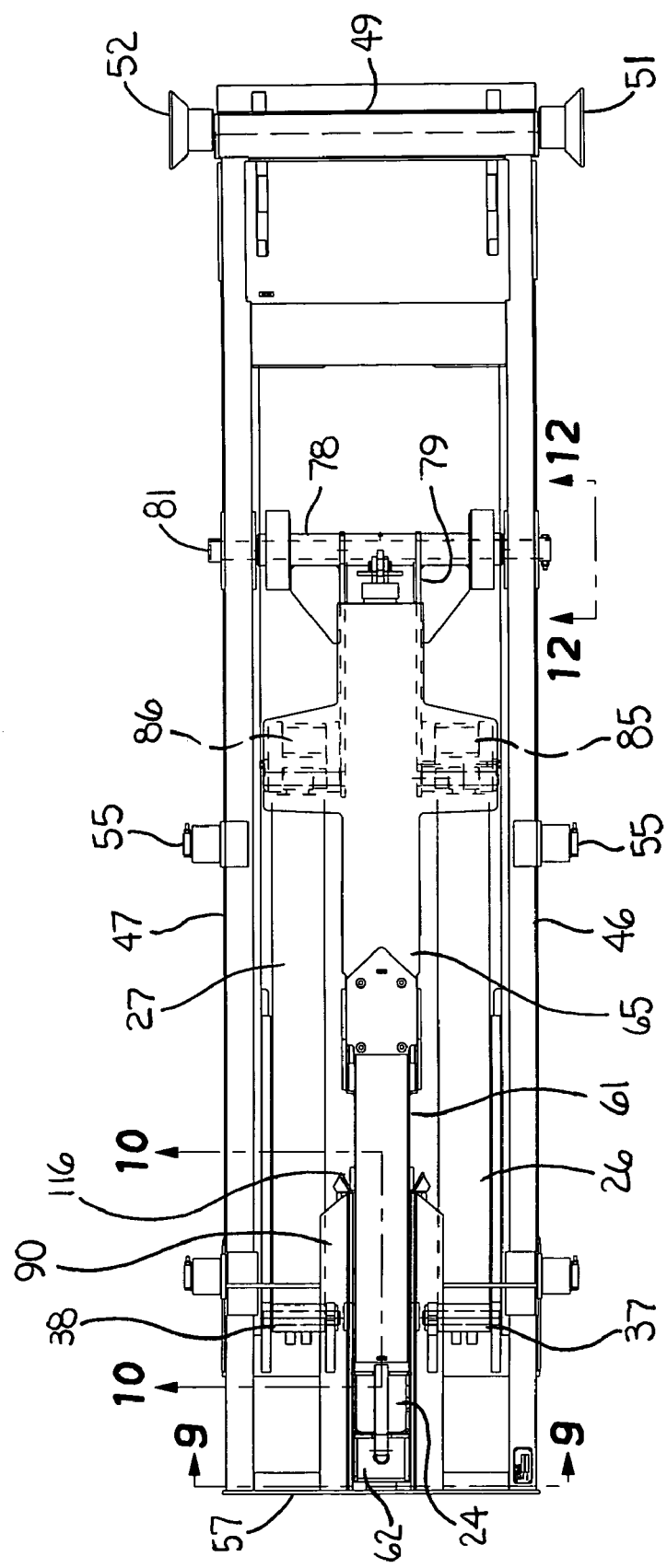
FIG. 7 is a fragmentary, top plan view of the hook lift hoist mounted on a vehicle frame.

The tilt frame 22 comprises left and right tilt frame members 46 and 47 pivotally connected at their rear ends to the rear ends of the sub-frame members 33 and 34 respectively by pivot assembly or hinge 49. As best seen in FIG. 7 (which is a fragmentary, top plan view of the hook lift hoist assembly 1 secured to the vehicle frame 6) guide rollers 51 and 52, including inwardly angled outer edges, are rotatably mounted on the rear ends of the tilt frame members 46 and 47 respectively. The guide rollers 51 and 52 support and guide a container as it is loaded onto or unloaded from the tilt frame 22 by the lift arm 24. Additional support rollers 55 are rotatably mounted on the outer edges of the left and right tilt frame members 46 and 47 to support a container 4 and facilitate loading and unloading it onto and off of the tilt frame 22. The left and right tilt frame members 46 and 47 are connected together at their distal ends by a cross-brace 57.

Figure 2:
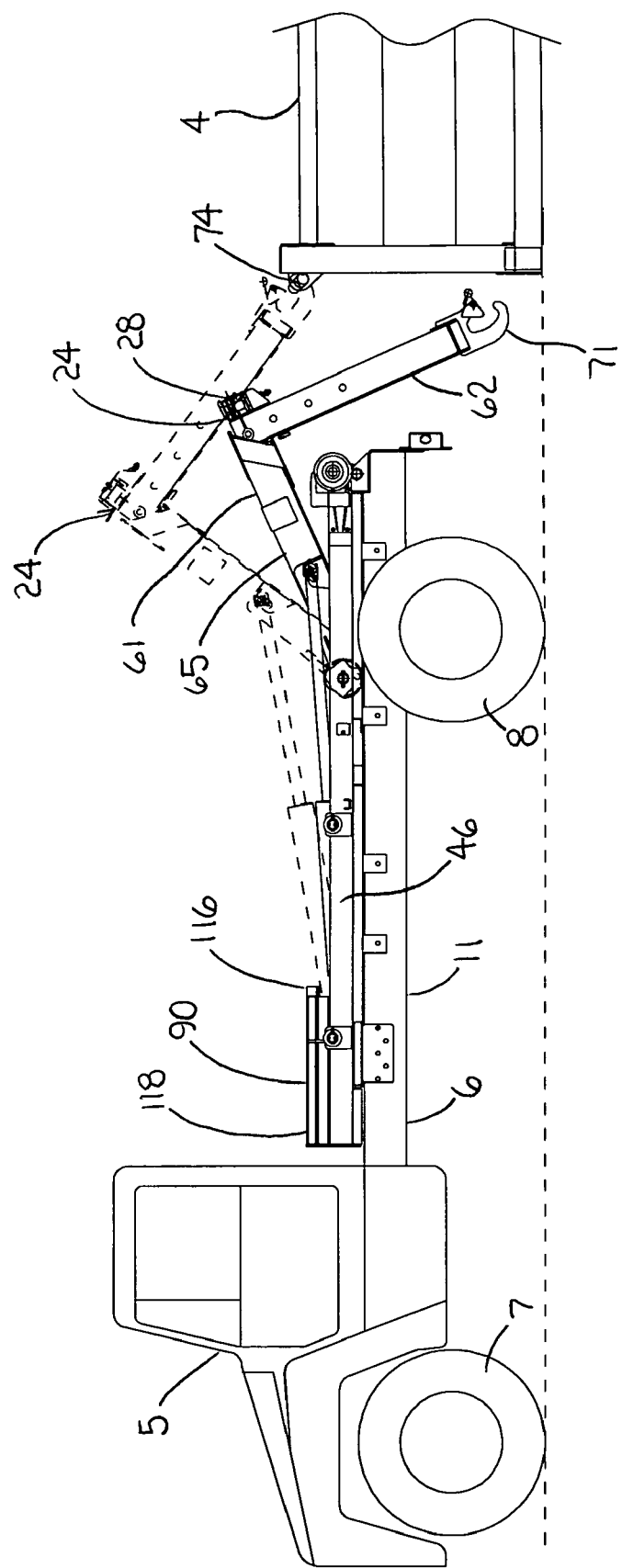
FIG. 2 is a view similar to FIG. 1 showing the lift arm in a fully extended position proximate a container supported on the ground and showing in phantom lines the lift arm coupled to the container.
Figure 8:
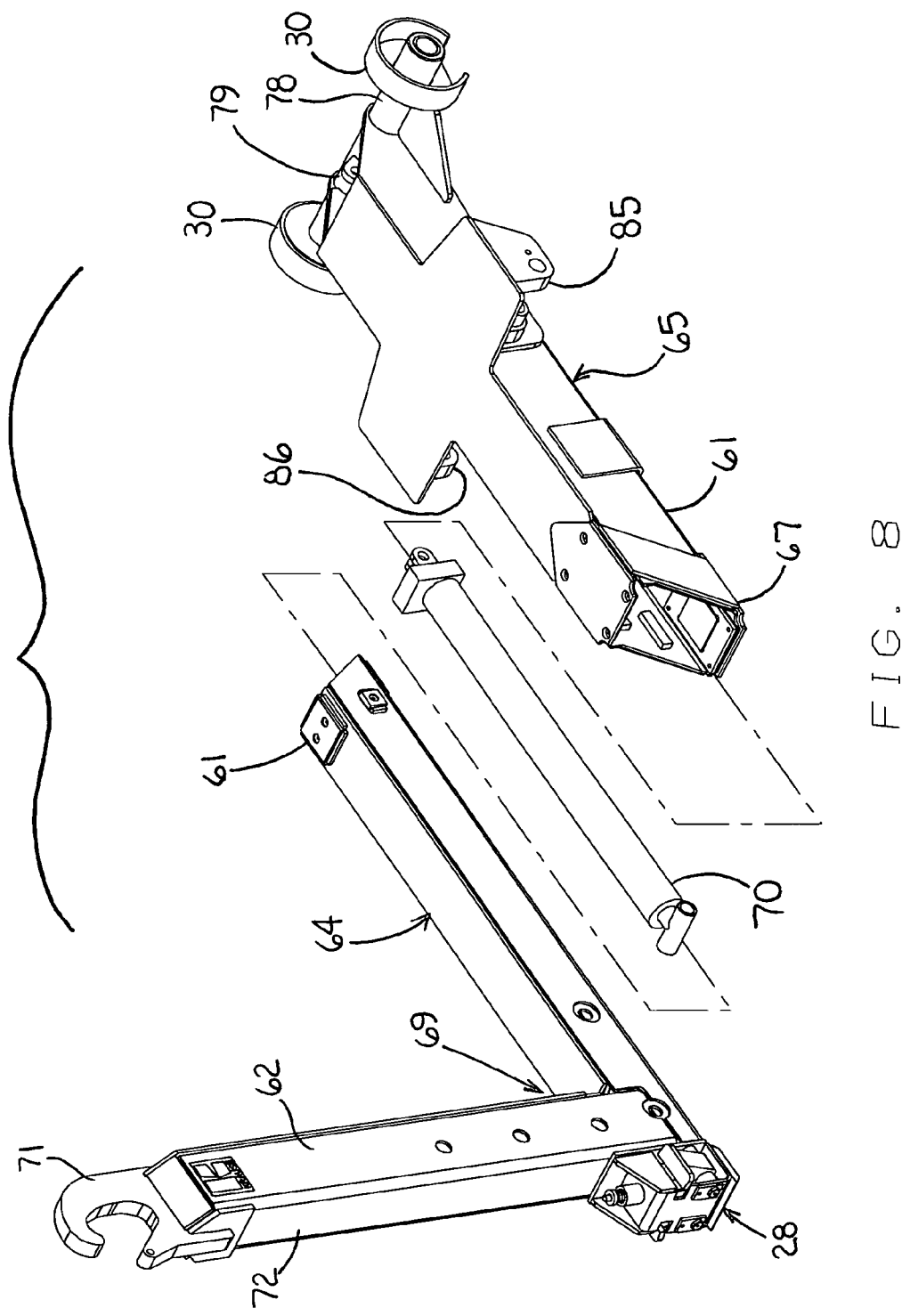
FIG. 8 is an exploded left side elevational view of the lift arm.

The lift arm 24 is pivotally connected between the left and right tilt frame members 46 and 47 at approximately one third of the distance between the rear and front ends thereof. As best seen in FIGS. 2 and 8, the lift arm 24 is generally L-shaped and includes a first leg 61 connected to and extending perpendicular to a second leg 62. The first leg 61 is further formed from an inner section 64 telescopically mounted within an outer section or outer boom 65. An outer end 67 of the inner section 64 is connected to the second leg 62 and collectively the inner section 64 of first leg 61 and second leg 62 may be referred to as the inner boom 69. A hydraulic actuator 70 connected between the inner section 64 and outer section 65 is used to selectively extend and retract the inner boom 69 relative to the outer boom 65 through controls (not shown) provided on the truck 3.

A first container coupling member or hook 71 is formed on the free end 72 of the second leg 62 opposite the first leg 61. The hook 71 is adapted to engage a pin or second container coupling member 74 mounted on a mast 75 of a container 4 to permit movement of the container 4 by the lift arm 24. It is foreseen that the pin 74 could be mounted on the free end of the lift arm second leg 62 and the hook 71 on the container or that other means for coupling with or grasping a container 4 by the lift arm 24 could be utilized.

Referring to FIGS. 7 and 8, a hub, sleeve or pivot tube 78 is welded to and extends transverse to a pivot end 79 of the outer boom 65. The lift arm 24 is pivotally connected to and between the left and right tilt frame members 46 and 47 by a pivot shaft 81 extending through the hub 78 and connected to the tilt frame members 46 and 47. Distal ends of the left and right hydraulic actuators 26 and 27, connected at their opposite ends to the actuator mount 36, are connected to devises 85 and 86 formed on opposite sides of the outer boom 65 and generally medially thereof.

Figure 1:
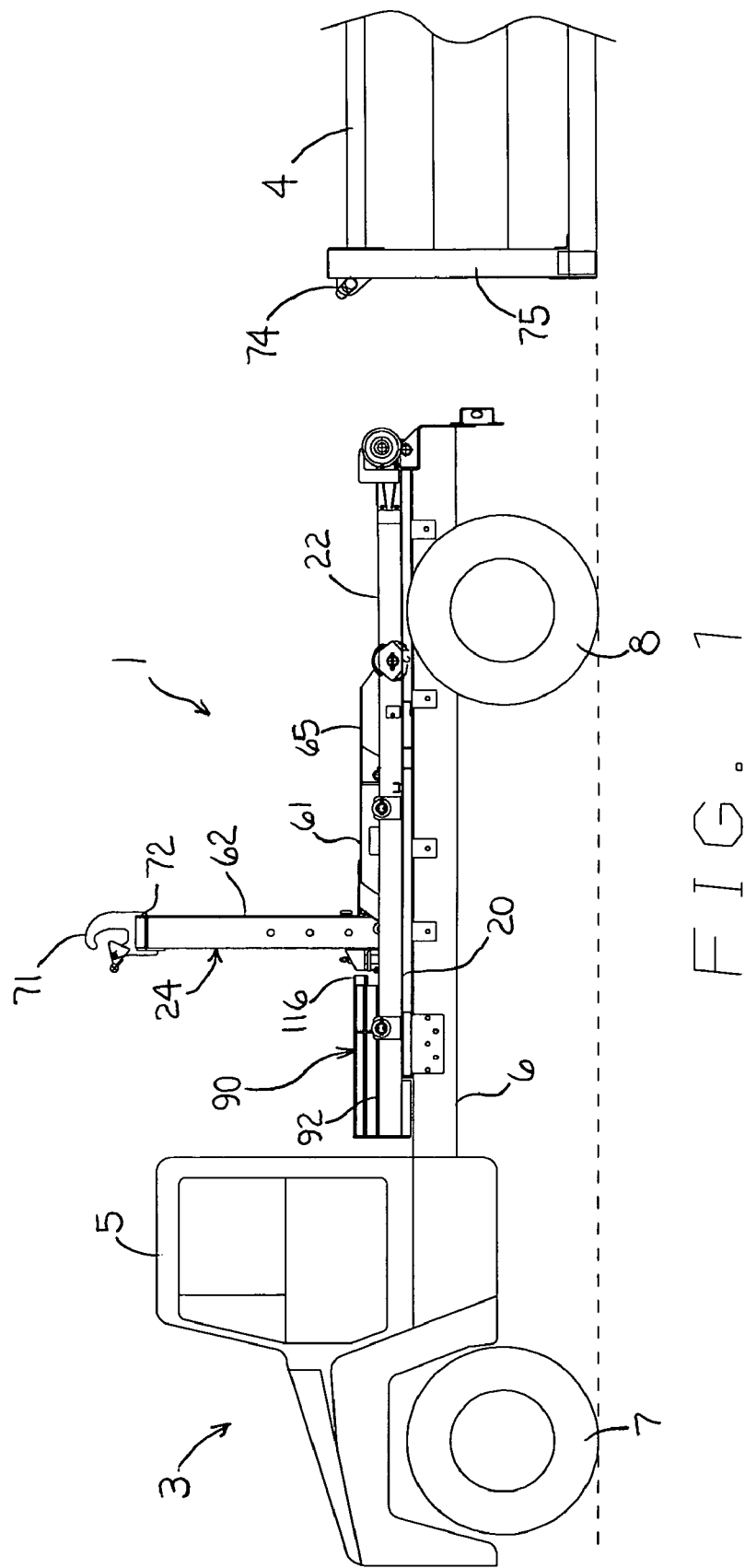
FIG. 1 is a fragmentary, left side elevational view of a vehicle mounted hook lift hoist and a container for loading onto the vehicle using the hook lift hoist and showing a lift arm in a retracted position.

When the hydraulic actuators 26 and 27 are fully retracted, as in FIGS. 1, 4 and 7, the first leg 61 of lift arm 24, including outer boom 65 generally extends in parallel orientation to and between the left and right tilt frame members 46 and 47, which may be referred to as a retracted position or loaded position for the lift arm 24, its first leg 61, or the outer boom 65. In this position, the second leg 62 of lift arm 24 generally extends perpendicular to the left and right tilt frame members 46 and 47.

Extension of the hydraulic actuators 26 and 27 pivots the lift arm 24 rearward. When actuators 26 and 27 are fully extended, as shown in FIG. 2, the first leg 61 of lift arm 24, including outer boom 65, extends at an angle of approximately 160 degrees relative to the left and right tilt frame members 46 and 47 forward of pivot shaft 81. The position of the lift arm 24 including first leg 61 when the actuators are fully extended may be referred to as the fully extended or unloaded position. In the fully extended position, the hook 71 of the second leg 62 is positioned behind and below the main beams 11 and 12 of the truck frame 6. From this position, the hook 71 can be maneuvered and raised by an operator to engage and couple with pins 74 positioned at various heights depending on the height of the surface on which the container 4 is supported.

Figure 3:
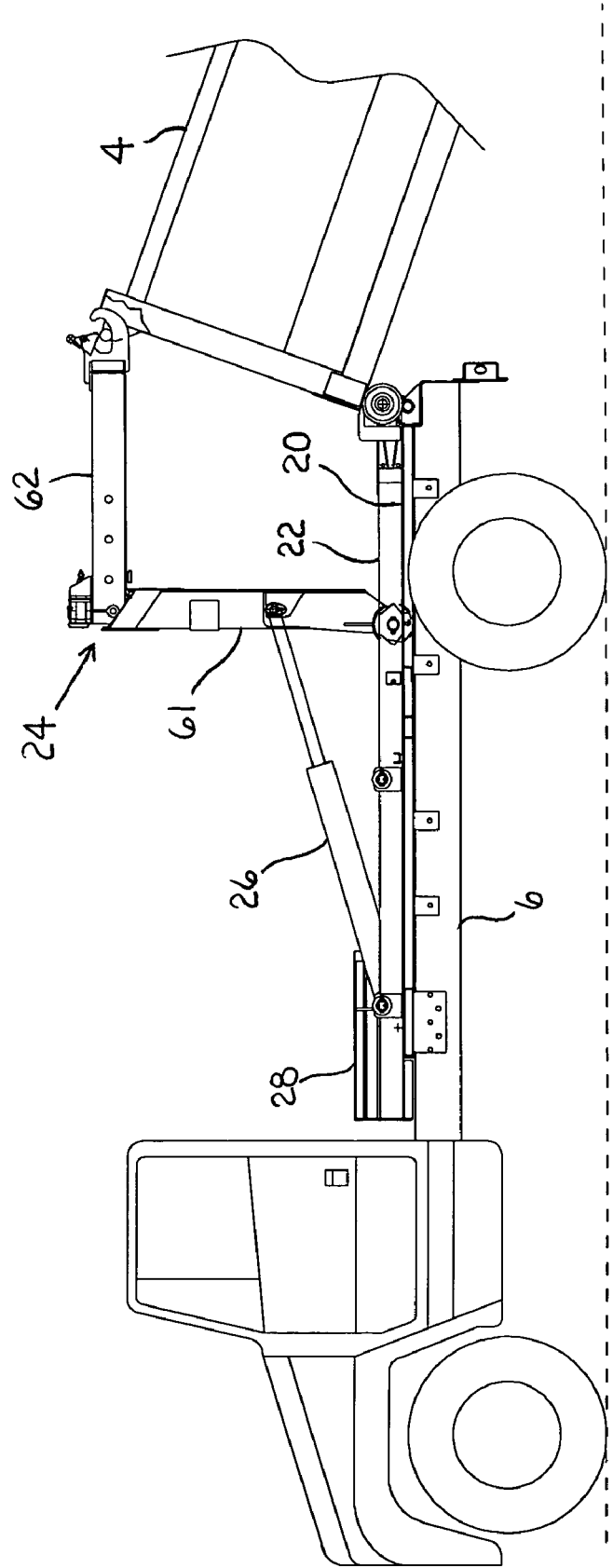
FIG. 3 is a view similar to FIG. 1 showing the lift arm advanced between the retracted and extended position with a container supported thereon

Once the lift arm 24 is coupled to a container 4 via hook 71 and pin 74, retraction of the actuators 26 and 27 and therefore the lift arm first leg 61 to the retracted position, pulls the container up onto the tilt frame members 46 and 47 with the assistance of guide rollers 51 and 52 and support rollers 55. FIG. 3 shows the lift arm 24 extending between the unloaded and the loaded position with a container 4 secured to the hook 71 and the first leg 61 of lift arm 24 extending at an angle of approximately ninety degrees relative to the tilt frame 22. Loading and unloading of a container 4 onto and off of the tilt frame members 46 and 47 preferably occurs with the inner boom 69 retracted relative to the outer boom 65. After a container 4 has been pulled up and onto the tilt frame members 46 and 47 by pivoting the lift arm 24 to the retracted or loaded position, the container 4 may be moved further onto the tilt frame members 46 and 47 and toward the front of the truck 3, as shown in FIG. 4, by extending the inner boom 69 relative to the outer boom 65 through extension of boom extension actuator 70.

Referring to FIGS. 8 and 9, the lift arm latch 28 is mounted on the inner boom 69 at the corner between the first and second legs 61 and 62. As the inner boom 69 is extended toward the front of the truck 3, with the lift arm 24 in the pivotally retracted position, the lift arm latch 28 engages a lift arm latch receiver 90 mounted to the tilt frame 22 between the left and right tilt frame members 46 and 47 to latch or lock the lift arm 24 to the tilt frame 22. The latch receiver 90 is formed by a pair of inwardly facing channel members 92 connected to the tilt frame members 46 and 47 by struts 94. The channel members 92 extend between and parallel to the tilt frame members 46 and 47 from the front end of the tilt frame 22 to a position just short of the space occupied by the lift arm latch 28 when the lift arm 24 is in the pivotally retracted position and the inner boom 69 is fully retracted as in FIG. 1.

The opposed channel members 92 form a channel 96 for receiving the inner boom 69. Inwardly projecting shoulders 98 are formed on the upper edge of the channel members 92 with a slot 100 extending therebetween. The inwardly projecting shoulders 98 are adapted to engage bearing plates 104 on pivotal latch members 106, pivotally mounted in recesses 108 formed on opposite sides of the lift arm latch 28. The bearing plates 104 are formed toward the upper end of the pivotal latch members 106 and the pivotal latch members 106 are mounted over-center in the recesses 108 so that upper ends of the bearing plates 104 normally extend out of the recesses 108. Stops 110 formed along an inner upper edge of the latch members 106 prevent the upper ends of the latch members 106 from rotating completely out of the recesses 108. When the pivotal latch members are in their resting position, the bearing plates 104 extend outward from the recess 108 at a slight downward angle. In this position, the outer edge 112 of each latch member 106 slopes inward from top to bottom and functions as a cam surface facilitating retraction of the pivotal latch members 106 as discussed below.

Inwardly sloping horizontal guide members 116 (see FIG. 7) are formed on the rear end of each channel member 92 just behind and above the shoulder 98. Similarly, inwardly and downwardly sloping vertical guide members 118 (see FIG. 9) are formed on and extend above each shoulder 98 of the channel members 92. The horizontal guide members 116 help guide the inner boom 69 and the lift arm latch 28 into the receiver channel 96 and slot 100. As the inner boom 69 is advanced into the channel 96, the bearing plates 104 of latch members 106, in their resting position, extend just below the shoulders 98 of channel members 92. The interference between the bearing plates 104 of latch members 106 and shoulders 98 of channel members 92 connects the lift arm 24 to the tilt frame 22 and prevents pivoting of the lift arm 24 without pivoting of the tilt frame 22.

If the inner boom 69 is extended relative to the outer boom 65 to a sufficient degree as the lift arm 24 is pivoted toward its retracted position, the outer edges 112 of the pivotal latch members 106 will engage the vertical guide members 118 of channel members 92. Further downward movement of the latch members 106 relative to the vertical guide members 118 pivots the bearing plates 104 of the latch members 106 into the recesses 108 of the lift arm latch 28 permitting the latch 28 to pass through slot 100 and into the channel 96. Once the bearing plates 104 advance past the shoulders 98 of channel members 92, the latch members 106 pivot outward to position the bearing plates 104 below the shoulders 98.

As the inner boom 69 is advanced through the channel 96 of receiver 90, both the tilt frame 22 and therefore the lift arm 24 are prevented from pivoting until the tilt frame latch 42 is released, which occurs as the inner boom 69 reaches a fully extended position as shown in FIG. 11. As generally shown in FIG. 10, when the inner boom 69 is extended to its fully extended position through the lift arm latch receiver 90, the inner boom 69 engages a mechanical actuator 120 on the tilt frame latch 42 which withdraws a spring loaded latch bolt or tongue 122 from beneath the latch plate 40 on the sub-frame 20. Withdrawal of the latch tongue 122 from beneath latch plate 40, permits the tilt frame 22 to pivot about hinge 49 and relative to the sub-frame 20 and truck frame 6.

When the tilt frame 22 is connected to the lift arm 24 by lift arm latch 28, the lift arm cannot pivot relative to the tilt frame 22. Therefore, extension of the actuators 26 and 27, when the tilt frame latch 42 is disengaged, causes the tilt frame 22 to pivot at the pivot assembly 49 as shown in FIG. 5. Pivoting of the tilt frame 22 is used primarily to dump the contents of a container 4 supported on the tilt frame 22. The tilt frame latch 42 generally prevents the tilt frame 22 from being pivoted to dump the contents of a container 4, unless the container 4 attached to the hook 71 is fully loaded onto the tilt frame 22 by advancing the lift arm 24 to the pivotally retracted position and extending the inner boom 69 to its fully extended position.

Once the contents of a container 4 are dumped, the actuators 26 and 27 are retracted to pivot the tilt frame 22 back into abutting relationship with the sub-frame 20 as shown in FIG. 4. The container 4 is unloaded from the tilt frame 22 by first retracting the inner boom 69 to a fully retracted position relative to the outer boom 65 (as in FIG. 1). Referring to FIG. 11, as the inner boom 69 is drawn out of engagement with the tilt frame latch mechanical actuator 120, a spring 124 (seen in FIGS. 5 and 6) advances the latch tongue 122 back beneath the latch plate 40 on sub-frame 20, locking the tilt frame 22 to the truck frame 6. Once the inner boom 69 is fully retracted, the lift arm 24 is pivoted toward the fully extended position (as shown in FIG. 2) to permit uncoupling of the hook 71 from the pin 74 on container 4.

Figure 12:
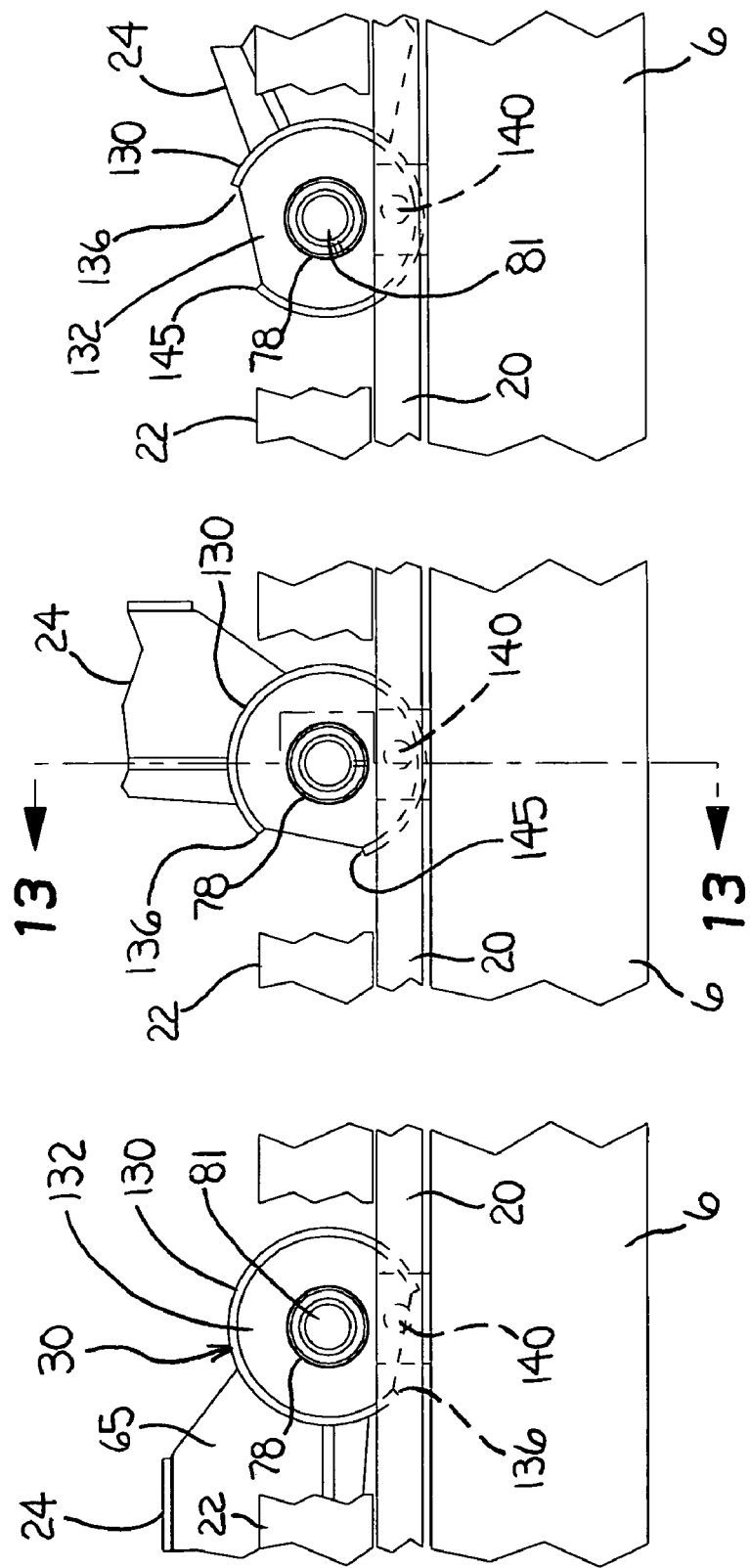
FIG. 12a is an enlarged and fragmentary side elevational view taken generally along line 12-12 of FIG. 7 and showing the orientation of a stud and a discontinuous arcuate coupling member of a ring lock when the lift arm is in a retracted position.
FIG. 12b is a view similar to FIG. 12a showing the lift arm rotated approximately ninety degrees out of the retracted position as in FIG. 3.
FIG. 12c is a view similar to FIG. 12a showing the lift arm rotated to the extended position as in FIG. 2.
FIG. 12d is a view similar to FIG. 12a showing an alternative embodiment with a discontinuous arcuate member forming an arc of approximately 160 degrees and showing the lift arm in a retracted position.
FIG. 12e is a view similar to FIG. 12d showing the lift arm in a fully extended position.
FIG. 12f is a view similar to FIG. 12a showing an alternative embodiment with a discontinuous arcuate member forming an arc of approximately 90 degrees and showing the lift arm extended approximately 90 degrees from the retracted position.
FIG. 12g is a view similar to FIG. 12d showing the lift arm in a fully extended position.
Figure 12:
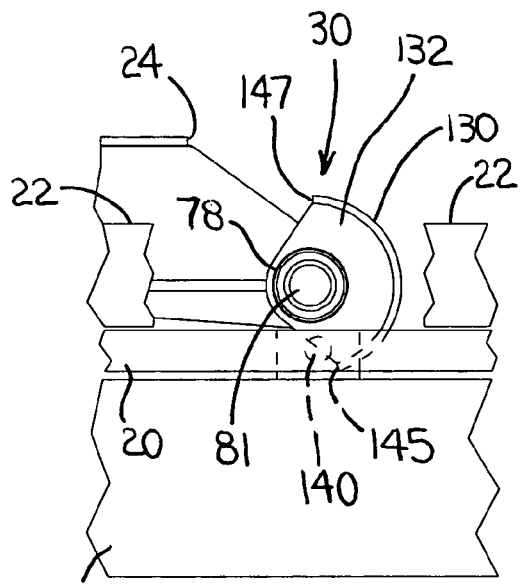
Figure 12:
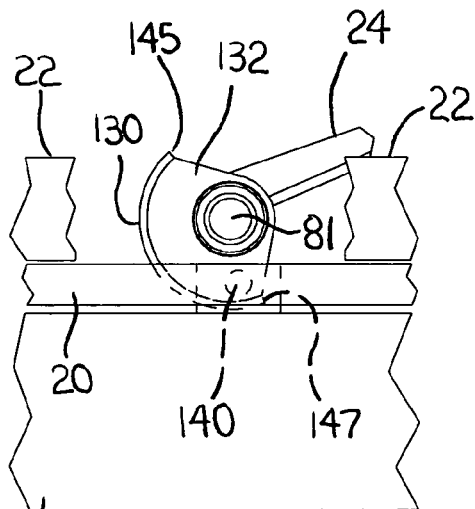
Figure 12:
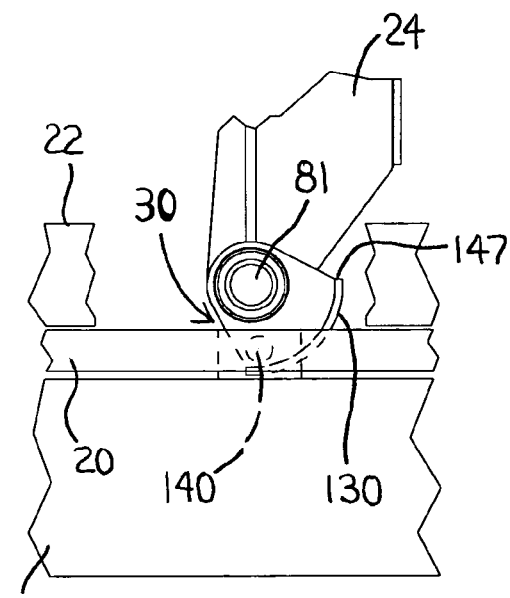
Figure 12:
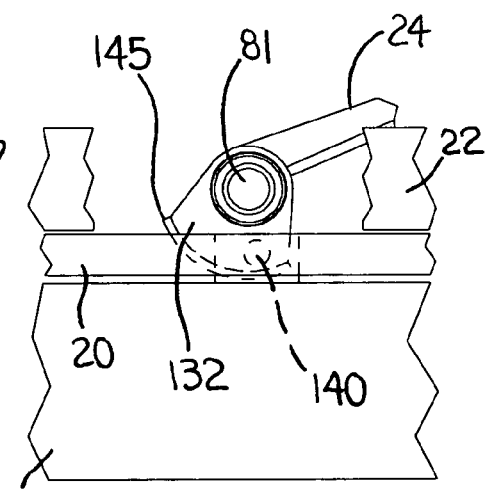
Figure 13:
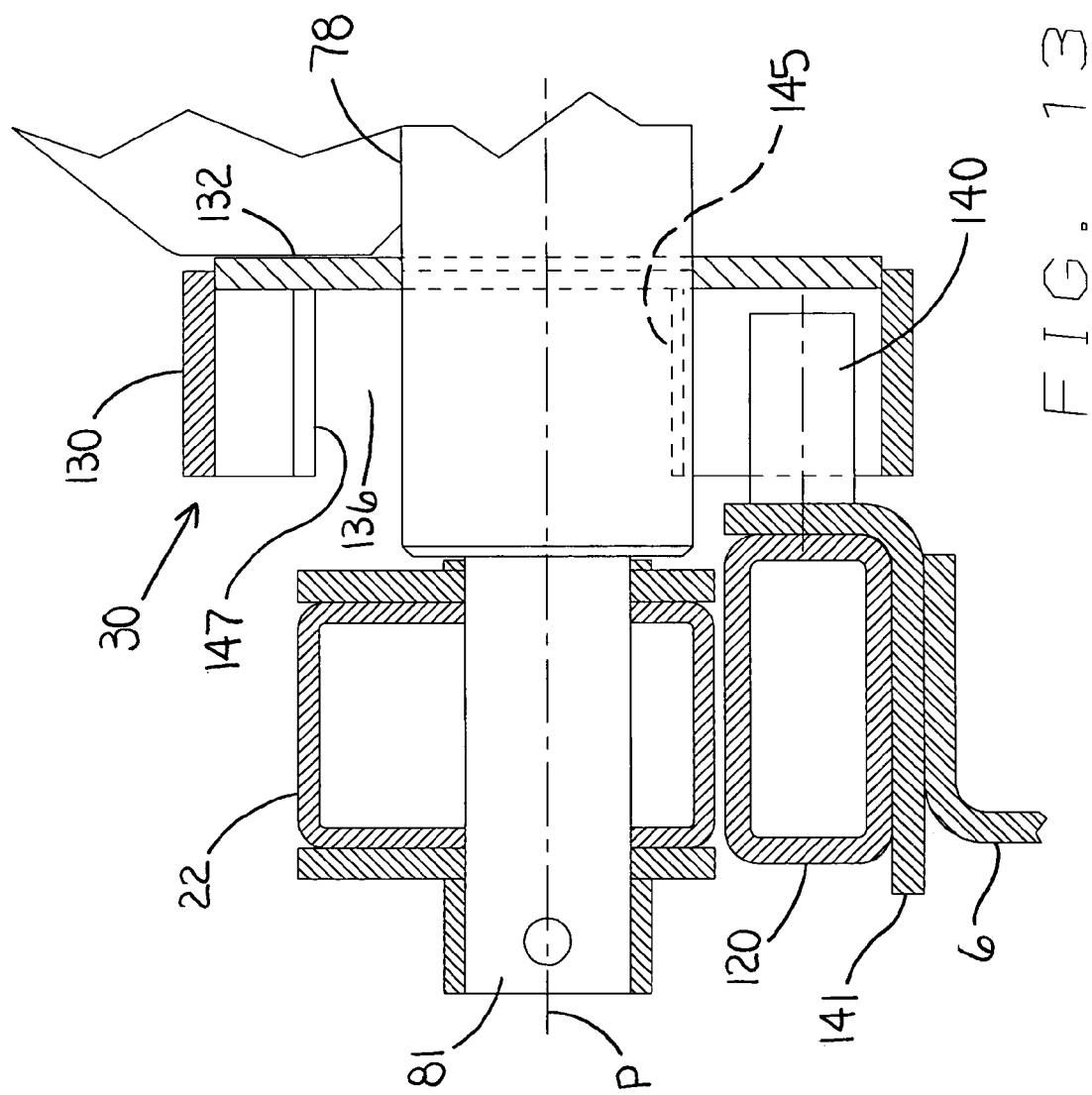
FIG. 13 is an enlarged and fragmentary cross-sectional view taken along line 13-13 of FIG. 12b.

Referring to FIGS. 12 and 13, the ring locks or tilt frame coupling members 30 are used to tie the tilt frame 22 to the main frame 6 proximate the pivot shaft 81, or the pivot axis P extending therethrough, when the lift arm 24 is pivoted out of the retracted position. Tying the tilt frame 22 to the main frame 6 at or near the pivot axis P, resists damage to the tilt frame 22 from the forces exerted thereon by the lift arm 24 as it pivots to lift a container 4 onto or off of the tilt frame 22. In addition, the ring locks 30 prevent the tilt frame 22 from pivoting relative to the main frame 6 when the tilt frame 22 abuts the sub-frame 20 and as the lift arm 24 pivots out of the retracted position. Only when the lift arm 24 is rotated to or proximate its retracted position can the tilt frame 22 pivot relative to the main frame 6.

Referring to FIGS. 12 and 13, each ring lock 30 comprises a discontinuous arcuate coupling member or semi-annular ring 130 fixedly connected to the hub 78 by a web or annular disc 132 and extending in spaced relationship and axial alignment around the hub 78. The ring locks 30 are mounted on the hub 78 on opposite sides of lift arm outer boom 65. Each of the arcuate coupling members 130 is preferably formed from a curved metal band which is connected to the hub 78 by welding the web 132 to the hub 78 and welding the curved metal band to the web 78. The arcuate coupling members 130 shown do not include any moving parts. Each arcuate coupling member 130 extends outward from the respective web 132 and is discontinuous along an arcuate section thereof to form a stud receiving slot or opening 136. The slot 136 is located on the coupling member 130 such that when the lift arm 24 is pivoted to the retracted position, the slot 136 generally opens or faces downward. With the lift arm 24 in the retracted position, as shown in FIG. 12*a*, the slot 136, or discontinuous portion of the curved metal band, extends from approximately 165 degrees to 225 degrees relative to vertical along an arcuate path extending from vertical, toward the rear of the truck 3 and back toward the front of the truck 3.

Each ring lock 30 further comprises a metal stud or pin 140 fixedly mounted to opposed legs of the sub-frame 20 and extending inwardly therefrom. Because the sub-frame 20 is fixedly connected to the left and right main beams 11 and 12, the studs 140 may be described as being fixedly connected to and extending inward from the left and right main beams 11 and 12 of truck frame 6. Referring to FIG. 13, the studs 140 are shown as welded to an angled metal plate 141 which is welded to sub-frame 20. A portion of the angled metal plate 141 is shown extending between sub-frame 20 and main frame 6 in FIG. 13. The studs may be connected to the sub-frame and main frame 6 by other means including bolting the studs 140 to the sub-frame 20. It is to be understood that the studs 140 and the tilt frame members 46 and 47 could be directly connected to the main beams 11 and 12 of vehicle frame 6 without the use of a sub-frame 20. As used herein, the term "base frame" is intended to include either the vehicle frame 6 alone, without the use of a sub-frame 20 or the vehicle frame 6 in combination with a sub-frame 20.

The studs 140 are connected to the sub-frame 20 and the discontinuous arcuate coupling members 130, are positioned relative to the hub 78 of the lift arm 24, such that no portion of the arcuate coupling members 130 extend below the associated studs 140 when the tilt frame 22 is in its retracted position relative to the sub-frame 20 as shown in FIG. 12*a*. When the lift arm 24 is pivoted out of the retracted position, the discontinuous arcuate coupling member 130 of each ring lock 30 is pivotally advanced beneath the associated stud 140 as best seen in FIGS. 12*b* and 12*c*. The stud 140 extends in closely spaced relation to an inner surface of the semi-annular ring 130. When a load is supported by the lift arm 24, to the extent the forces acting on the tilt frame members 46 and 47 by the lift arm 24, cause flexion of the lift frame members 46 and 47, the semi-annular ring 130 of each ring lock 30 is brought into contact with the associated stud 140 to interconnect the tilt frame 22 to the main frame 6. The interconnection between the tilt frame member 22 and the main frame 6 prevents or resists further flexion and possible damage to the tilt frame members 22.

In addition, when the studs 140 are positioned above any portion of the associated arcuate coupling member 130, excluding the slot 100, the stud 140 will engage the semi-annular ring 130 if an operator tries to pivot or lift the tilt frame 22 relative to the main frame 6. Because the slot 100 of each ring lock 30 is only positioned below the stud 140 when the lift arm 24 is in the retracted position, the tilt frame 22 can only be pivoted out of its retracted position when the lift arm 24 is positioned in or in close proximity to its retracted position. Once the lift arm 24 is pivoted out of its retracted position, to a point where the annular coupling members 130 extend below the associated studs 140, the annular coupling members prevent pivoting of the tilt frame members 46 and 47 relative to the truck 3 and provide the additional support to the tilt frame members 46 and 47 discussed above. A layer of grease may be applied to and maintained on an inner surface of the semi-annular ring 130 to facilitate rotation of the ring lock 30 and lift arm 24 when loaded.

In the embodiment shown in FIGS. 12*a-c*, the arcuate coupling member forms an arc, from a leading edge 145 to a trailing edge 147, of approximately three hundred degrees with the opening, slot or discontinuous portion 136 extending approximately sixty degrees. As discussed previously, one of the objects of the present invention is to couple or tie the tilt frame 22 to the base frame proximate the pivot axis P (see FIG. 13) when the lift arm is supporting a load to reduce the strain on the tilt frame and prevent damage thereby. The strain on the tilt frame 22 at its point of connection to the lift arm 20 through pivot shaft 81 is believed to be the greatest when the lift arm is just lifting a container 4 off of the ground with the lift arm 20 extending behind the vehicle 3 as shown in phantom lines in FIG. 2. In addition, if the hoist operator inadvertently extends instead of retracts the actuators 26 and 27 when trying to lift a container 4 off of the ground, considerable upward forces are exerted on the tilt frame 22 by the lift arm along the pivot axis P. It is further believed that the strain on the tilt frame 22 from the lift arm will decrease significantly when the container is drawn onto the tilt frame 22 to a sufficient degree that the weight of the container 4 is supported more directly by the tilt frame 22 and vehicle frame 6 and not by the lift arm 20. This occurs when the outer boom 65 is rotated back past a vertical alignment with the frame 6 and toward the retracted position. It is preferable to size and position the arcuate coupling members 130 to extend below the studs 140 through the entire range of rotational motion of the lift arm 20 except to the extent necessary to permit a leading edge 145 of each arcuate coupling member 130 to pass by the associated stud 140 when the tilt frame 22 is pivoted relative to the base frame with the lift arm 20 in a retracted position relative to the tilt frame 22. Alternatively, the arcuate coupling members 130 could be sized to extend below the studs 140 only through that portion of the range of rotational motion of the lift arm 20 wherein the greatest amount of strain is placed on the tilt frame 22 in loading and unloading a container 4 onto the vehicle.

In the hook lift hoist 1 shown, the lift arm 20 is shown as pivoting approximately 160 degrees from the retracted position to the fully extended position. The arcuate coupling members 130 therefore preferably form an arc of at least approximately 160 degrees, such as shown in FIGS. 12*d-e*. It is foreseen that arcuate coupling members 130 each forming an arc of approximately 70 to 90 degrees and positioned to extend below the studs 140 when the lift arm 20 is pivoted approximately 90 degrees from a retracted position as shown in FIG. 12*f* to the fully extended position of approximately 160 degrees as shown in FIG. 12*g* could be adequate for tying the tilt frame 22 to the base frame 6 when the greatest strain is exerted on the tilt frame 22 by the lift arm. By forming the arcuate coupling members 130 from metal bands that form arcs of approximately 300 degrees as shown in FIGS. 12*a-c*, greater strength can be obtained for the arcuate coupling members 130 due in large part to the longer weld used to connect the curved metal band to the web 132.

It is to be understood that while certain forms of this invention have been illustrated and described, it is not limited thereto except insofar as such limitations are included in the following claims and allowable equivalents thereof. For example, it is foreseen that the relative positions of the studs 140 and the discontinuous arcuate coupling members could be reversed. A stud could be connected to the hub 78 of the lift arm 24 on an arm positioning the stud rearward of the hub 78. An arcuate groove sized to receive the stud might then be formed in the sub-frame. When the lift arm is in the retraced position, the stud would extend above the arcuate groove. As the lift arm is pivoted out of the retracted position, the stud would pivot or rotate into the groove and abutment of the stud against the portion of the sub-frame forming the upper edge of the groove would prevent the tilt frame 22 from pivoting relative to the base frame. The discontinuous arcuate coupling members 130 or alternatively the arcuate groove may also be referred to as one of a first or second tilt frame coupling member. The studs 140, with which the arcuate coupling members 130 may be coupled, may be referred to as another of a first or second tilt frame coupling member. As used herein the coupling members may also be referred to as locking members.

What is claimed is:

1. A hoist mountable to a base frame of a vehicle for loading and unloading containers onto and off of the vehicle, said hoist comprising:
    a) a tilt frame pivotally connectable to the base frame;
    b) a lift arm having a pivot end pivotally connected to said tilt frame about a lift arm pivot axis; said lift arm pivotal between a retracted position and an extended position;
    c) a first tilt frame coupling member mounted on the base frame; and
    d) a second tilt frame coupling member connected to said lift arm proximate said pivot end and pivoting with said lift arm about said lift arm pivot axis; wherein,
    e) said second tilt frame coupling member is positioned relative to said lift arm so as not to extend beneath said first tilt frame coupling member when said lift arm is in said retracted position and to advance beneath said first tilt frame coupling member when said lift arm is pivoted out of said retracted position, to couple said lift arm and said tilt frame to said base frame.

2. The hoist as in claim 1 wherein said first and second tilt frame coupling members extend in closely spaced relation or in engagement with each other when said lift arm is pivoted out of said retracted position.

3. The hoist as in claim 1 wherein said lift arm includes a hub which is pivotally mounted on a pivot shaft connected to said tilt frame and said first tilt frame coupling member is connected to said hub.

4. The hoist as in claim 1 further comprising a lift arm lock selectively coupling said lift arm to said tilt frame when said lift arm is in said retracted position and preventing pivoting of said lift arm relative to said tilt frame.

5. A hoist mountable to a frame of a vehicle for loading and unloading containers onto and off of the vehicle, said hoist comprising:
    a) a sub-frame connectable to the frame of the vehicle;
    b) a tilt frame pivotally connected to said sub-frame;
    c) a lift arm having a pivot end pivotally connected to said tilt frame about a lift arm pivot axis; said lift arm pivotal between a retracted position and an extended position;
    d) a first tilt frame coupling member mounted on the sub-frame; and
    e) a second tilt frame coupling member connected to said lift arm proximate said pivot end and pivoting with said lift arm about said lift arm pivot axis; wherein,
    f) said second tilt frame coupling member is positioned relative to said lift arm so as not to extend beneath said first tilt frame coupling member when said lift arm is in said retracted position and to advance beneath said first tilt frame coupling member when said lift arm is pivoted out of said retracted position to couple said lift arm and said tilt frame to said sub-frame.

6. The hoist as in claim 5 wherein said first and second tilt frame coupling members extend in closely spaced relation or in engagement with each other when said lift arm is pivoted out of said retracted position.

7. The hoist as in claim 5 further comprising a lift arm lock selectively coupling said lift arm to said tilt frame when said lift arm is in said retracted position and preventing pivoting of said lift arm relative to said tilt frame.

8. A hoist mountable to a base frame of a vehicle for loading and unloading containers onto and off of the vehicle, said hoist comprising:
   a) a tilt frame pivotally connected to said base frame;
   b) a lift arm having a pivot end pivotally connected to said tilt frame about a pivot axis; said lift arm pivotal between a retracted position and an extended position;
   c) a stud connected to and projecting from said base frame; and
   d) a discontinuous arcuate coupling member connected to said lift arm proximate said pivot end and in axial alignment with said pivot axis;
   e) wherein said arcuate coupling member is positioned relative to said lift arm so as not to extend beneath said stud when said lift arm is in said retracted position and to automatically advance beneath said stud when said lift arm is pivoted out of said retracted position to couple said lift arm and said tilt frame to said base frame.

9. The hoist as in claim 8 wherein said discontinuous arcuate coupling member has an inner surface and said inner surface extends in closely spaced relation or in engagement with said stud when said lift arm is pivoted out of said retracted position.

10. The hoist as in claim 8 wherein said lift arm includes a hub which is pivotally mounted on a pivot shaft connected to said tilt frame and said discontinuous arcuate coupling member is connected to said hub.

11. The hoist as in claim 8 further comprising a lift arm lock selectively coupling said lift arm to said tilt frame when said lift arm is in said retracted position and preventing pivoting of said lift arm relative to said tilt frame.

12. The hoist as in claim 8 wherein:
   a) said base frame comprises left and right base frame members generally extending in parallel alignment;
   b) said tilt frame comprises left and right tilt frame members pivotally connected to and generally extending in parallel alignment with said left and right base frame members respectively;
   c) said stud comprises one of a first and second stud projecting inward from said left and right base frame members;
   d) said discontinuous arcuate coupling member comprises one of a left and right discontinuous arcuate coupling members, one each mounted on opposite sides of said lift arm.

13. The hoist as in claim 8 wherein said discontinuous arcuate coupling member forms an arc having a degree of rotation approximately equal to a range of rotation of said lift arm.

14. The hoist as in claim 8 wherein said discontinuous arcuate coupling member forms an arc of approximately one hundred and sixty degrees or greater.

15. The hoist as in claim 8 wherein said discontinuous arcuate coupling member forms an arc of approximately ninety degrees or greater.

16. A hoist mountable to a frame of a vehicle for loading and unloading containers onto and off of the vehicle, said hoist comprising:
   a) a sub-frame connectable to the frame of the vehicle;
   b) a tilt frame pivotally connected to said sub-frame;
   c) a lift arm having a pivot end pivotally connected to said tilt frame about a pivot axis; said lift arm pivotal between a retracted position and an extended position;
   d) a stud connected to and projecting from said sub-frame;
   e) a discontinuous arcuate coupling member connected to said lift arm proximate said pivot end and in axial alignment with said pivot axis; said discontinuous arcuate coupling member is positioned relative to said lift arm so as not to extend beneath said stud when said lift arm is in said retracted position and to automatically advance beneath said stud when said lift arm is pivoted out of said retracted position to couple said lift arm and said tilt frame to said base sub-frame.

17. The hoist as in claim 16 wherein said discontinuous arcuate coupling member has an inner surface and said inner surface extends in closely spaced relation or in engagement with said stud when said lift arm is pivoted out of said retracted position.

18. The hoist as in claim 16 further comprising a lift arm lock selectively coupling said lift arm to said tilt frame when said lift arm is in said retracted position and preventing pivoting of said lift arm relative to said tilt frame.

19. The hoist as in claim 16 wherein said lift arm includes a hub which is pivotally mounted on a pivot shaft connected to said tilt frame and said discontinuous arcuate coupling member is connected to said hub.

20. The hoist as in claim 19 wherein:
   a) said sub-frame comprises left and right sub-frame members generally extending in parallel alignment and connected to left and right main frame members of said vehicle;
   b) said tilt frame comprises left and right tilt frame members pivotally connected to and generally extending in parallel alignment with said left and right sub-frame members respectively;
   c) said stud comprises one of a first and second studs projecting inward from said left and right sub-frame members;
   d) said discontinuous arcuate coupling member comprises one of a left and right discontinuous arcuate coupling member, each of which are mounted on said hub on opposite sides of said lift arm.

21. The hoist as in claim 16 wherein said discontinuous arcuate coupling member forms an arc having a degree of rotation approximately equal to a range of rotation of said lift arm.

22. The hoist as in claim 16 wherein said discontinuous arcuate coupling member forms an arc of approximately one hundred and sixty degrees or greater.

23. The hoist as in claim 16 wherein said discontinuous arcuate coupling member forms an arc of approximately ninety degrees or greater.

24. A hoist mountable to a base frame of a vehicle for loading and unloading containers onto and off of the vehicle, said hoist comprising:
   a) a tilt frame pivotally mounted relative to the base frame;
   b) a generally L-shaped lift arm having a first leg extending generally perpendicular to a second leg, said second leg of said lift arm having a first container coupling member at a free end thereof; said first container coupling member adapted to releasably engage a second container coupling member on a container; said first leg formed from first and second telescoping sections such that said second leg may be telescopically advanced between retracted and extended positions relative to said first telescoping section of said first leg; said first leg of said lift arm having a pivot member formed at a pivot end thereof and pivotally connected to said tilt frame about a pivot axis to permit pivoting of said lift arm between a retracted position and an extended position;

c) an actuator, connected at a first end to said base frame and at a second end to said lift arm and advanceable between retracted and extended positions;

d) a lift arm lock comprising a first lift arm lock member on said lift arm and a second lift arm lock member on said tilt frame, said first lift arm lock member engaging said second lift arm lock member when said lift arm is in said retracted position and said second leg of said lift arm is advanced out of said retracted position; such that advancement of said actuator from said retracted position towards said extended position, when said first lift arm lock member is disengaged from said second lift arm lock member, pivots said lift arm from said loaded position toward said unloaded position, and advancement of said actuator from said retracted position towards said extended position, when said first lift arm lock member engages said second lift arm lock member, causes said tilt frame to pivot relative to said vehicle frame; and e) a first tilt frame lock member connected to said base frame and a second tilt frame lock member mounted on said lift arm, said second tilt frame lock member disengaged from said first tilt frame lock member when said lift arm is positioned in said retracted position; and said second tilt frame lock member adapted to engage said first tilt frame lock member when said lift arm is advanced out of said retracted position to couple said lift arm and said tilt frame to said base frame.

25. A hoist mountable to a frame of a vehicle for loading and unloading containers onto and off of the vehicle, said hoist comprising:

a) a sub-frame connectable to the frame of the vehicle;

b) a tilt frame pivotally connected to said sub-frame;

c) a generally L-shaped lift arm having a first leg extending generally perpendicular to a second leg, said second leg of said lift arm having a first container coupling member at a free end thereof; said first container coupling member adapted to releasably couple with a second container coupling member on a container; said first leg formed from first and second telescoping sections such that said second leg may be telescopically advanced between retracted and extended positions relative to said first telescoping section of said first leg; said first leg of said lift arm having a pivot member formed at a pivot end thereof and pivotally connected to said tilt frame about a pivot axis to permit pivoting of said lift arm between a retracted position and an extended position;

d) an actuator, connected at a first end to said sub-frame and at a second end to said lift arm and advanceable between retracted and extended positions;

e) a lift arm lock comprising first lift arm lock member on said lift arm and a second lift arm lock member on said tilt frame, said first lift arm lock member engaging said second lift arm lock member when said lift arm is in said retracted position and said second leg of said lift arm is advanced out of said retracted position; such that advancement of said actuator from said retracted position towards said extended position, when said first lift arm lock member is disengaged from said second lift arm lock member, pivots said lift arm from said retracted position toward said extended position, and advancement of said actuator from said retracted position towards said extended position, when said first lift arm lock member engages said second lift arm lock member, causes said tilt frame to pivot relative to said sub-frame; and f) a first tilt frame lock member connected to said sub-frame and a second tilt frame lock member mounted on said lift arm, said second tilt frame lock member disengaged from said first lock member when said lift arm is positioned in said position; and said second tilt frame lock member adapted to engage said first tilt frame lock member when said lift arm is advanced out of said retracted position to couple said lift arm and said tilt frame to said sub-frame.

* * * * *